United States Patent
Sundaresan et al.

(10) Patent No.: US 9,609,586 B2
(45) Date of Patent: Mar. 28, 2017

(54) CONTROLLING ACCESS TO A NETWORK

(75) Inventors: Sankar Ram Sundaresan, San Jose, CA (US); Pinto Sweekar Hillary, Karnataka (IN); Govindaraj Anand, Karnaraka (IN); Binh Truong, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1074 days.

(21) Appl. No.: 13/204,510

(22) Filed: Aug. 5, 2011

(65) Prior Publication Data

US 2013/0036158 A1    Feb. 7, 2013

(51) Int. Cl.
G06F 15/16    (2006.01)
H04W 48/18    (2009.01)
H04L 29/12    (2006.01)
H04L 29/06    (2006.01)

(52) U.S. Cl.
CPC ........... H04W 48/18 (2013.01); H04L 63/107 (2013.01); *H04L 61/2575* (2013.01); *H04L 63/101* (2013.01)

(58) Field of Classification Search
CPC .... H04W 48/18; H04L 63/107; H04L 63/101; H04L 61/2575
USPC ..................... 709/203, 227; 726/2
See application file for complete search history.

(56) References Cited

U.S. PATENT DOCUMENTS

| | | | |
|---|---|---|---|
| 6,112,305 A | 8/2000 | Dancs et al. | |
| 6,466,779 B1 * | 10/2002 | Moles et al. | 455/410 |
| 6,603,758 B1 | 8/2003 | Schmuelling et al. | |
| 7,477,648 B2 * | 1/2009 | Ota et al. | 370/401 |
| 7,616,615 B2 | 11/2009 | Sueyoshi et al. | |
| 7,617,317 B2 | 11/2009 | Jones et al. | |
| 7,800,534 B1 * | 9/2010 | Yenney et al. | 342/357.59 |
| 8,321,508 B2 * | 11/2012 | Lingafelt et al. | 709/204 |
| 2005/0227669 A1 * | 10/2005 | Haparnas | 455/410 |
| 2006/0248600 A1 * | 11/2006 | O'Neill | 726/29 |
| 2007/0218898 A1 * | 9/2007 | Agarwal et al. | 455/433 |
| 2009/0113516 A1 * | 4/2009 | Vorreiter et al. | 726/1 |
| 2010/0100972 A1 * | 4/2010 | Lemieux et al. | 726/34 |
| 2011/0098030 A1 * | 4/2011 | Luoma | 455/419 |
| 2011/0271335 A1 * | 11/2011 | Carpenter et al. | 726/7 |
| 2012/0042005 A1 * | 2/2012 | Papakostas et al. | 709/203 |
| 2012/0066386 A1 * | 3/2012 | McGowan et al. | 709/225 |

FOREIGN PATENT DOCUMENTS

CA    2766314 A1 * 12/2010
EP    2200350 A1    6/2010

* cited by examiner

*Primary Examiner* — Abdulkader M Alriyashi
(74) *Attorney, Agent, or Firm* — Fabian VanCott (57) ABSTRACT

A method for controlling access to a network includes, with a client device, sending a request over a network to a server to determine a public logical address for the client device, determining, using the public logical address, whether the client device is connected to the network through one of a number of approved network service providers, and disconnecting from the network if the client device is not connected to the network through one of the approved network service providers.

20 Claims, 5 Drawing Sheets

CONTROLLING ACCESS TO A NETWORK

BACKGROUND

Computing devices are able to connect to a network such as the Internet through a variety of methods. Access to a network is provided through a network service provider. For example, a subscriber to the Internet may access the Internet through a modem provided by the network service provider. The subscriber may attach the cable modem to a wireless router. The wireless router may then be set up to offer access to the network to devices within range of that wireless router. Alternatively, a network service provider may offer access over a cellular phone network, often referred to as a $3^{rd}$ Generation (3G) or $4^{th}$ Generation (4G) network. Devices that are authorized to operate on that network may then access the Internet through the cellular phone network.

One type of device that relies on network access is a simplified computing device designed to provide media and other content to users. Such devices may lack the full functionality of a typical laptop computer or desktop computer. However, these simplified computing devices are well equipped to provide content that is tailored to a particular region. Such computing devices are often marketed in developing regions. The content available on these devices may be controlled through an aggregator server that is managed by the organization that sells the simplified computing device.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, one type of device that relies on network access is a simplified computing device designed to provide media and other content to users. Such devices may lack the full functionality of a typical laptop computer or desktop computer. However, these simplified computing devices are well equipped to provide content that is tailored to a particular region. Such computing devices are often marketed in developing regions. The content available on these devices may be controlled through an aggregator server that is managed by the organization that sells the simplified computing device.

In some cases, the entity that sells a particular simplified computing device may enter into a business agreement with one or more network service providers. The entity may agree to configure the device so that it will only access the Internet through those network service providers. Limiting a device to operate on certain networks is typically done with a piece of hardware within the device. For example, cellular phones include a Subscriber Identity Module (SIM) card. A SIM card is an integrated circuit that identifies the hardware and only allows the cellular phone to operate on a particular service provider's network. However, the use of hardware is not readily adaptable to changes in business arrangement such as inclusion of a new network service provider that the device is authorized to use.

In light of this and other issues, the present specification discloses methods and systems for locking a client device to use specific network service providers using only software. According to certain illustrative examples, when a client device accesses an aggregator server providing content to that device, the server may determine the public logical address such as a public Internet Protocol (IP) address of the client device. Communication over the internet is done using an internet protocol that arbitrarily assigns IP addresses to client devices connected to the network. The IP address is a logical address and thus differs from a physical address such as a Media Access Control (MAC) address which is hard-coded into a device.

A client device often accesses the Internet through a private network. A router that routes network traffic from the private network to the public network often assigns a private IP address to clients connected to the private network. The router itself is assigned its own address which acts as the public IP address for each of the client devices connected to the private network managed by that router. These types of routers are often controlled by internet service providers. Routers under the control of a particular network service provider will be given IP addresses within a range of IP addresses used only by that internet service provider.

According to certain illustrative examples, the client device can send a request to the aggregator server to determine its public logical address. The aggregator server will see the source logical address for this request as the public logical address for the client device. The aggregator server can then send that public logical address back to the client device. The client device can then compare its public logical address with a range of logical addresses that corresponds to the approved network service providers.

If the client device's public logical address is within the range of public addresses for approved network service providers, then the device can continue operation as normal. However, if the client device's public logical address is not within the list of approved logical addresses, then the client device will disallow access to a network resource of the network or disconnect from the network altogether. A network resource may be a particular source of content. In one example, the client device may disallow access to the Internet but still allow access to the aggregator server. The aggregator server may then provide a limited amount of content.

Alternatively, the process of comparing the public logical address with the list of approved public logical address may be performed by the aggregator server. In this case, upon determining the public logical address of the client device, the aggregator server can compare that public logical address with a table of logical address ranges used by network service providers through which the client device may operate. If the public address of the client device falls within one of the logical address ranges, then the device may stay connected to the network. However, if the public address of the client device is not within the provided range of logical addresses, then the server can send a message to the client device that will instruct the client device to disconnect from the network.

Through use of methods and systems embodying principles described herein, a client device may be locked to operation on a predetermined number of internet service providers. This is done without requiring any special hardware within the client devices. Because the methods and systems described herein are done with software, they are readily adaptable to changes in the allowed networks. For example, the logical address ranges for a particular network service provider may change. Alternatively, new network service providers may enter agreements with the entity that sells the client device. The list of approved logical address ranges may then be readily updated on the server without requiring changes to the hardware in each of the client devices.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
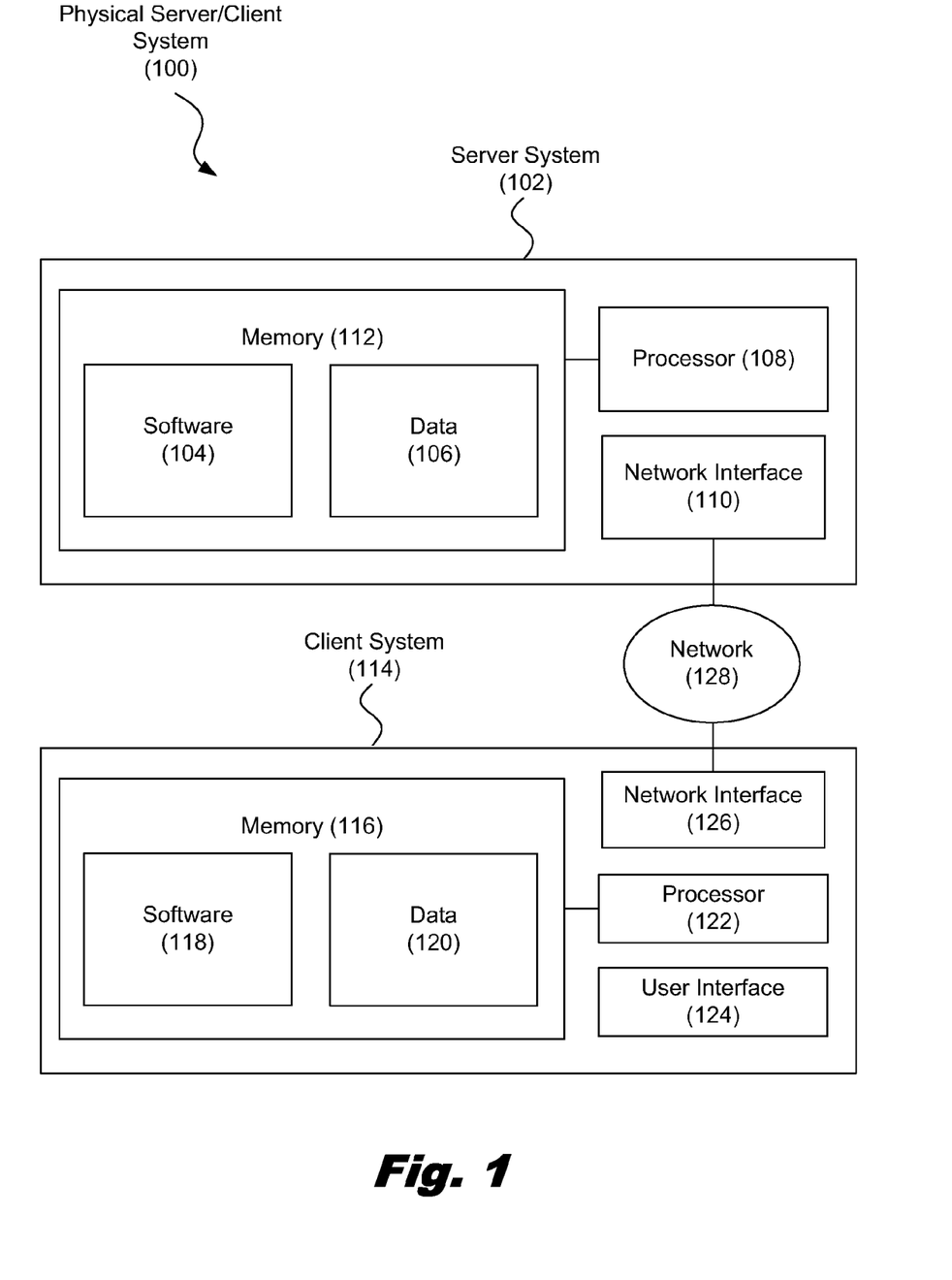
FIG. 1 is a diagram showing an illustrative physical client/server system, according to one example of principles described herein.

Referring now to the figures, FIG. 1 is a diagram showing an illustrative physical server client system (100). According to certain illustrative examples, the server system (102) includes a memory (112) having software (104) and data (106) stored thereon. The physical computing system (100) also includes a processor (108) and a network interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the server system (102). One type of application may be a content providing application designed to accumulate and provide content for simplified client devices. The data (106) stored within memory may be content accumulated by the server system (102).

The network interface (110) includes the hardware and software for interfacing with a network (128). Through the network, the server system can communicate with client systems (114). According to certain illustrative examples, a client system (114) includes a memory (116) having software (118) and data (120) stored thereon. The client system (114) also includes a processor (122), a network interface (126), and a user interface (124).

The software (118) may include an operating system. The operating system of the client system (114) allows various applications to interact properly with the hardware of the client system (114). One type of application may be a content application designed to receive content from the server system (102) and display that content to a user. The data (106) stored within memory (116) may be the content received from server system (102).

A user interface (124) may provide a means for a user to interact with the client system (114). The user interface (124) may include any collection of devices for interfacing with a human user. For example, the user interface (124) may include an input device such as a keyboard, mouse, or touchscreen and an output device such as a monitor.

Figure 2:
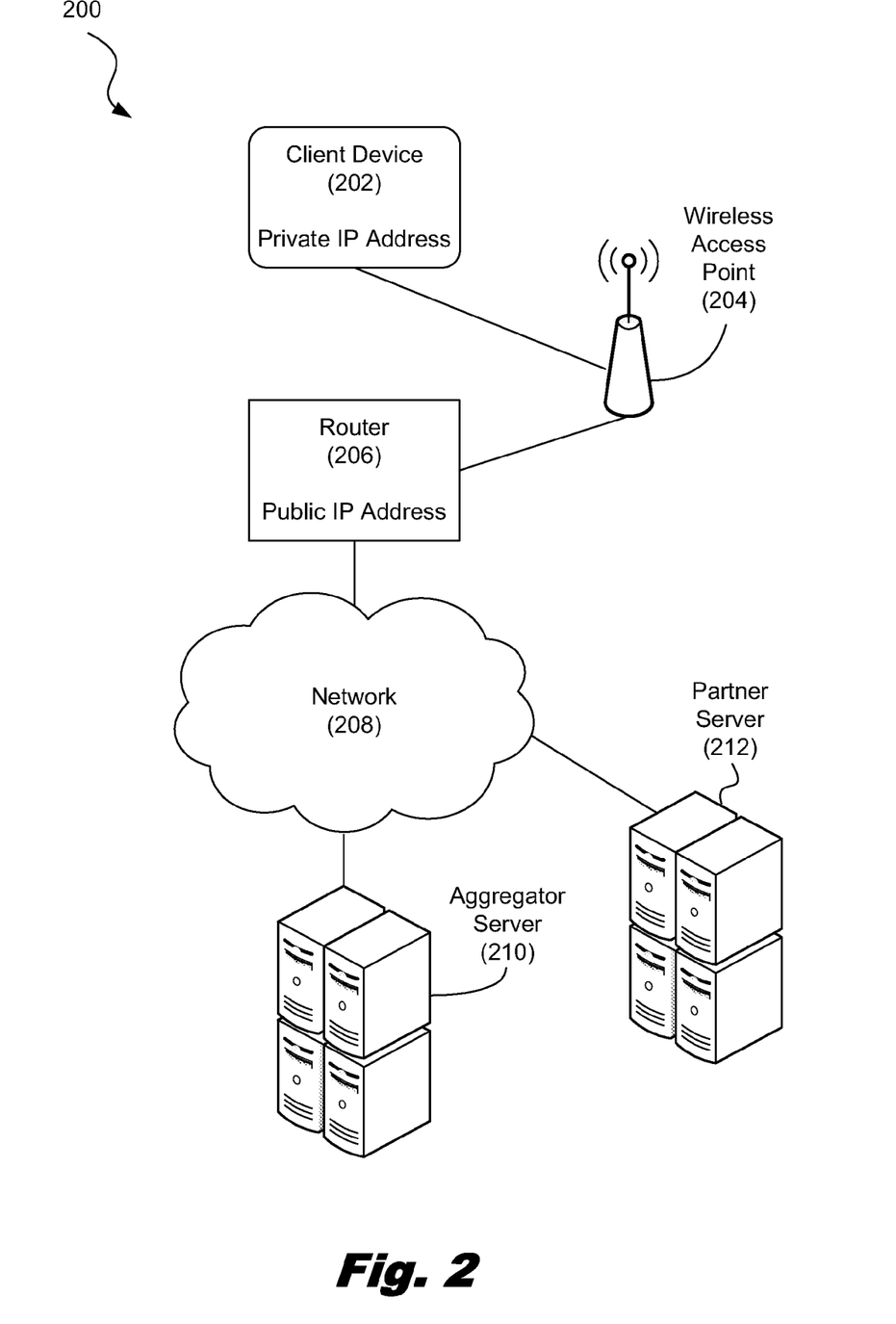
FIG. 2 is a diagram showing an illustrative network, according to one example of principles described herein.

FIG. 2 is a diagram showing an illustrative network (200). The network includes a client device (202) that is connected to a network (208) through a wireless access point (204) and a router (206). Through the network (208), the client device (202) can receive data from a server (210).

The client device (202) may be a variety of physical computing devices including a laptop computer, a desktop computer, a tablet computer or a mobile smart phone. In one example, the client device (202) is a simplified computing device designed for primarily displaying locally relevant content such as music, videos, and news. Such content may be accessed from an aggregator server (210) that holds content designed specifically for the simplified client device. Throughout this specification and in the appended claims, the term "aggregator server" is to be broadly interpreted as a server that is managed by an organization that sells a particular client device. That particular client device is designed to rely on communications from the aggregator server. The aggregator server (210) may be accessed through a network (208) such as the Internet.

The client device (202) may also obtain content from other servers that are managed by organizations that enter business relationships with the organization that manages the aggregator server. Such a server will be referred to as a partner server (212). The client device (202) may also access content available on the Internet.

A client device (202) will often connect to the Internet through a local network managed by a router (206). The router typically assigns a private IP address to each client device that connects to the local network. The router itself is often assigned a public IP address by the internet service provider that provides Internet access to the local network. When devices on the network (208) communicate with devices on the local network behind the router (202), they see the public address for that device rather than the private IP address.

A client device (202) may connect to a local network through a variety of methods. In one case, the client device (202) may physically connect to an Ethernet port. Alternatively, the client device (202) may connect wirelessly to the local network through a wireless access point (204). The wireless access point (204) communicates with a wireless network interface of the client device (202) by modulating electromagnetic waves. In some cases, the wireless access point (204) may be integrated with the router (204).

Through a network (208) such as the Internet, the client device may connect to an aggregator server (210) that provides content for the client device. The aggregator server (210) may be designed to validate the connection of the client device (202) to the network. The aggregator server (208) may also provide updates and new media content designed for the client device (202).

A subscriber to internet services will often connect his or her Internet service to a wireless access point to provide wireless internet access to a home or place of business. Client devices within range of the wireless access point may then be able to access the Internet. In some cases, access to a wireless access point may require credentials such as a username and password. In some cases, the internet access may be open to any device within range of the wireless access point. For example, businesses will often provide free internet access to customers.

As mentioned above, there may be cases where the entity that produces or sells a simplified client device enters into a business agreement with one or more internet service providers to limit use of the device to those specific providers. In this case, the client device should be configured to work only when connected to the Internet through an approved network service provider.

Figure 3:
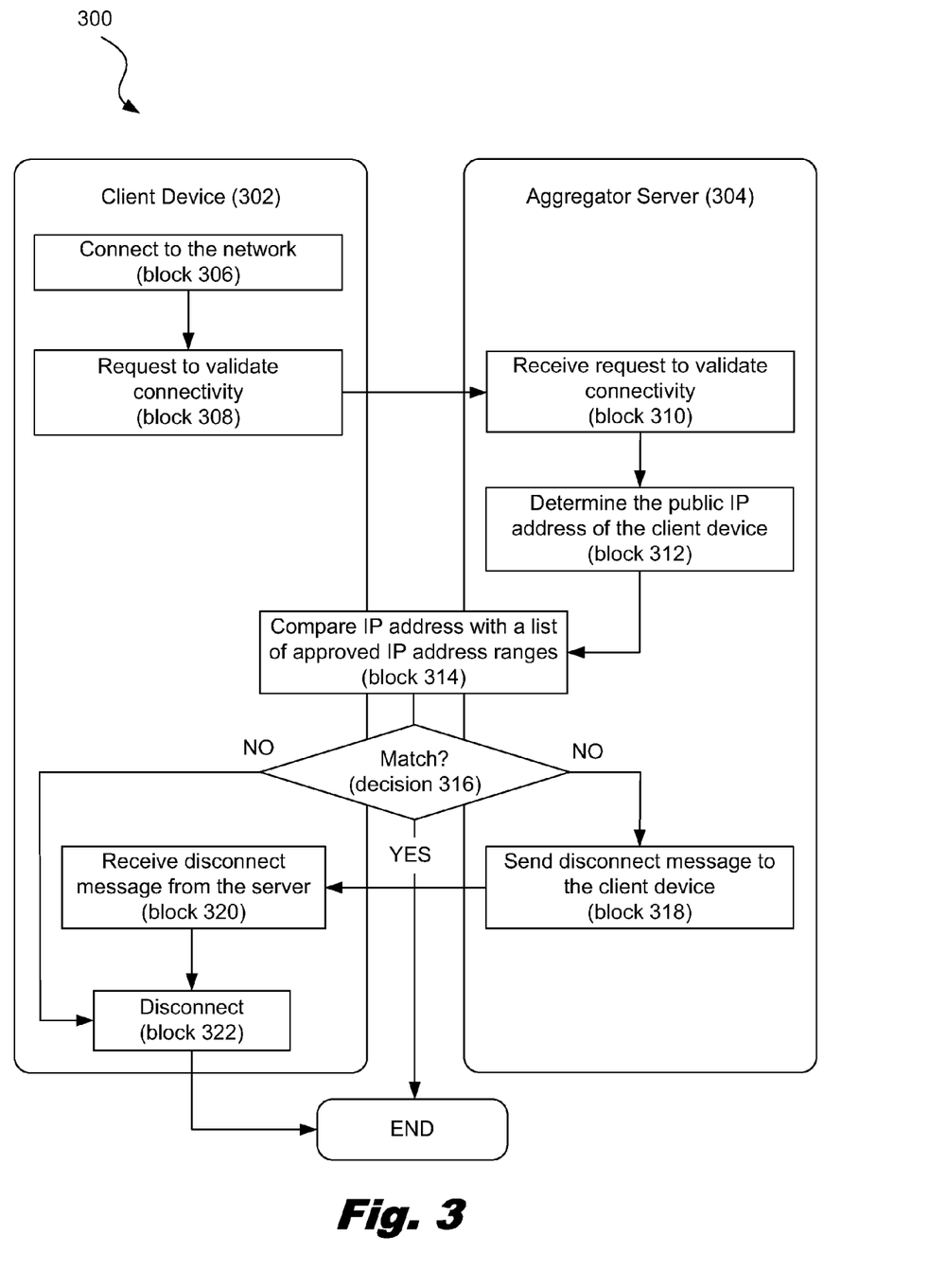
FIG. 3 is a flow diagram showing an illustrative process of locking a client device to specific network providers, according to one example of principles described herein.

FIG. 3 is a flow diagram showing an illustrative process (300) of locking a client device to specific network providers. The flow diagram illustrates actions performed by a client device (302) and actions performed by an aggregator server (304) providing content to the client device (302). According to certain illustrative examples, the process (300) starts when the client device (302) connects (block 306) to a network such as the Internet.

Upon connecting to the Internet, the client device (302) will then attempt to validate its connection to the network through the aggregator server (304). The client device (302) will then send (block 308) a request to validate its connection to the aggregator server. Upon receiving (block 310) the request to validate the connection from the client device (302), the aggregator server (304) will then determine (block 312) the public IP address of the client device (302).

After the public IP address of the client device has been determined, then either the client device (302) or the aggregator server (304) will compare (block 314) that public IP address with a list of approved IP address ranges. The list of approved IP address ranges may be provided by the internet service providers who have entered into a business agreement with the entity that sells the client device (302).

If the comparison is performed by the client device (302), then the aggregator server (304) will send the client device (302) a message indicating the public IP address of the client device (302). The client device (302) cannot get the IP address from its own network interface because that network interface may have been assigned a private IP address. A private IP address is not indicative of the network service provider currently providing internet access to the client device. The client device (302) will also maintain a table of the approved IP address ranges for comparison with its own public IP address. This table may be updated by the aggregator server (304) whenever the client device (302) connects to that server.

If the comparison is performed by the aggregator server (304), then the aggregator server (304) will maintain the table of approved IP address ranges. This table may be updated by a system administrator as the agreement between network service providers and the seller of the client device changes. For example, a new internet service provider may be added to the agreement. Alternatively, a network service provider may update the IP address ranges that correspond to that service provider.

It is then determined (decision 316) whether or not the public IP address of the client device falls within the range of IP addresses corresponding to approved network service providers. If it is determined (decision 316, YES) that the public IP address of a client device falls within the range of approved IP addresses, then it can be affirmatively known that the client device has accessed the aggregator server through an approved network service provider. The client device is thus allowed to continue operation on the network and have access to the content intended for the client device (302).

If it is determined (decision 316, NO) by the aggregator server (304) that the public IP address of the client device (302) does not fall within the range of approved IP addresses, then the aggregator server (304) will send (block 318) a disconnect message to the client device (302). Upon receiving (block 320) that message, the client device (302) will then disconnect (block 322) from the network. If it is determined (decision 316, NO) by the client device (302) that the public IP address of the client device (302) does not fall within the range of approved IP addresses, then the client system will disconnect (block 322) from the network. In one example, the user may be provided with a message that informs the user that he or she has connected to the aggregator server through an unapproved network.

Whether the client device (302) or the server (304) performs the comparison between the public logical address and the list of approved logical addresses, the client device can implement the logic that disconnects the client device from the network. In some cases, the client device may lose access to the Internet but may still be connected to the server and may have access to content that is provided by that server. The client device may be able to selectively allow access to various sources of content based on whether the client device is connected through an approved network.

Figure 4:
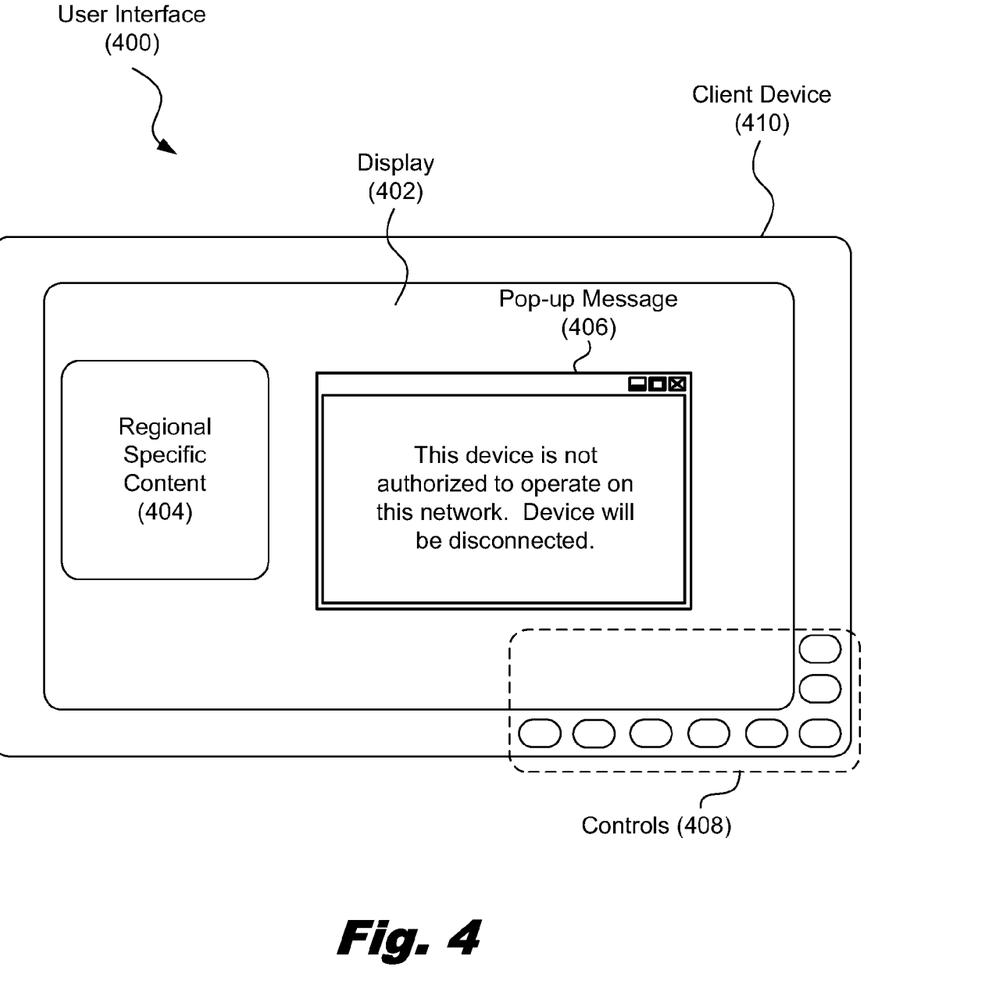
FIG. 4 is a diagram showing an illustrative client device user interface, according to one example of principles described herein.

FIG. 4 is a diagram showing an illustrative client device user interface (400). According to certain illustrative examples, the user interface (400) may be shown on a display (402) of a client device (410). The display may be a touchscreen display (402). In addition to allowing human interaction through the touchscreen display (402), the client device (410) may provide a number of physical controls (408).

The display (402) may be used to provide content (404) to the user such as music, pictures, videos, and news. The client device may be configured to receive regional specific content (404) that is tailored to the region where the device is sold. For example, citizens of a particular country or region of that country may be interested in particular sources and types of media. The aggregator server for client devices sold in that country may then be configured to provide that regionally relevant content to those client devices.

In one example, the client device may inform the user if the client device is disconnected from a network because it has connected through an unapproved network. The user may be informed through a pop-up message (406). In one example, the pop-up message may say "This device is not authorized to operate on this network. Device will be disconnected."

Figure 5:
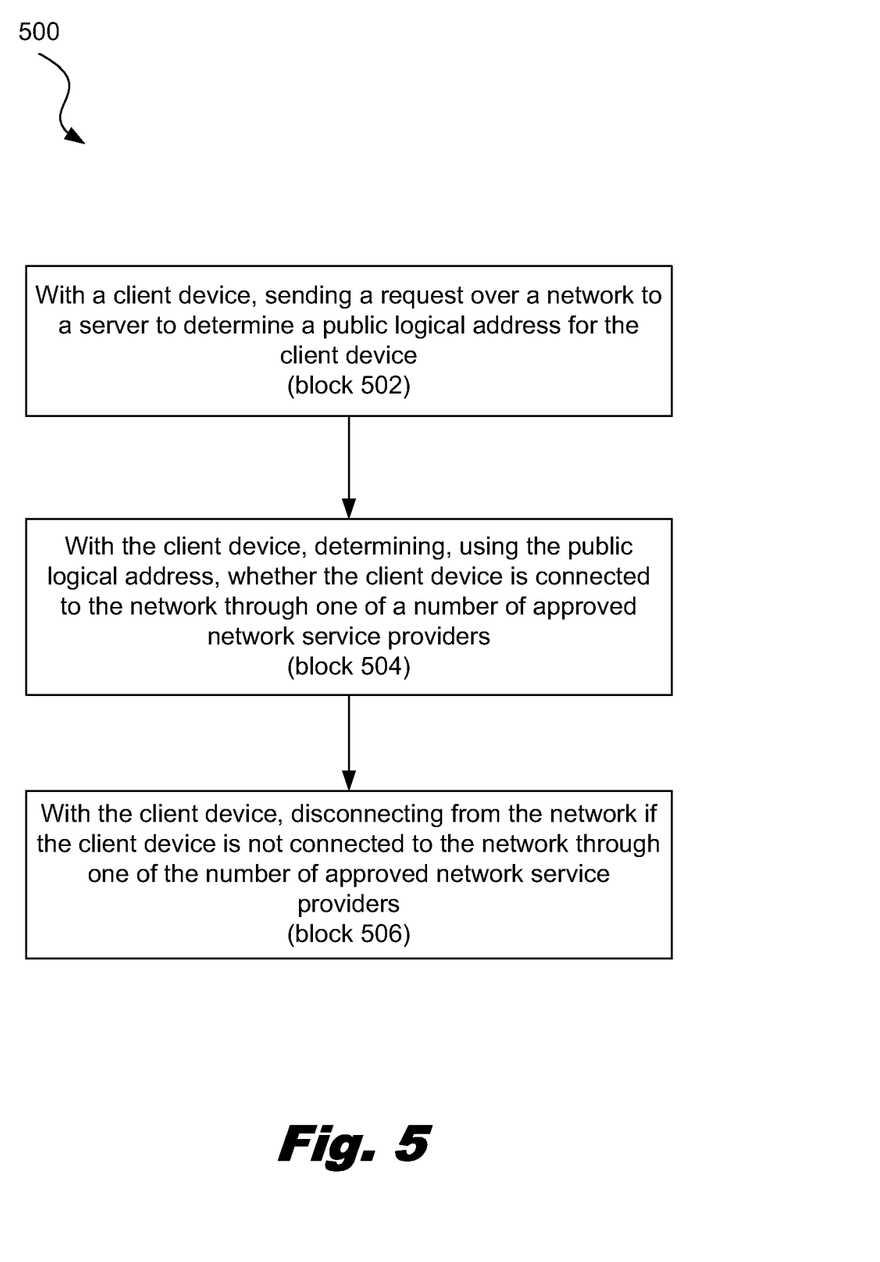
FIG. 5 is a flowchart showing an illustrative method for locking a client device to specific network service providers, according to one example of principles described herein.

FIG. 5 is a flowchart showing an illustrative method (500) for locking a client device to specific network service providers. According to certain illustrative examples, the method includes, with a client device, sending (block 502) a request over a network to a server to determine a public logical address for the client device, determining (block 504), using the public logical address, whether the client device is connected to the network through one of a number of approved network service providers, and disconnecting (block 506) from the network if the client device is not connected to the network through one of the number of approved network service providers.

In conclusion, through use of methods and systems embodying principles described herein, a client device may be locked to operation on a predetermined number of internet service providers. This is done without requiring any special hardware within the client devices. Because the methods and systems described herein are done with software, they are readily adaptable to changes in the allowed networks. For example, the logical address ranges for a particular network service provider may change. Alternatively, new network service providers may enter agreements with the entity that sells the client device. The list of approved logical address ranges may then be readily updated on the server without requiring changes to the hardware in each of the client devices.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for controlling access to a network, the method comprising:
   with a client device, sending a request over a network to a server to determine a public logical address for said client device;
   with said client device, determining, using said public logical address, whether said client device is connected to said network through one of a number of approved network service providers; and
   with said client device, disallowing access to a network resource from said network if said client device is not connected to said network through one of said number of approved network service providers.

2. The method of claim 1, further comprising, with said client device, maintaining a list of logical address ranges that correspond to said approved network service providers.

3. The method of claim 1, further comprising, selectively allowing said client device to access content over the network based on whether said client device is connected to said network through one of said number of approved network service providers.

4. The method of claim 1, further comprising, disconnecting from said network if said client device is not connected to said network through one of said number of approved network service providers.

5. The method of claim 1, wherein said logical address is an Internet Protocol (IP) address.

6. The method of claim 1, wherein an entity providing said client device has an agreement with said approved network service providers that said client device operate on said network only through said approved network service providers.

7. The method of claim 1, wherein, determining whether said client device is connected to said network through one of a number of approved network service providers comprises said client device determining whether said public logical address for said client device is within a range of addresses corresponding to an approved network service provider.

8. The method of claim 1, wherein, determining whether said client device is connected to said network through one of a number of approved network service providers comprises said client device receiving from the server a determination of whether said public logical address for said client device is within a range of addresses corresponding to an approved network service provider.

9. The method of claim 1, wherein, disallowing access to a network resource from said network if said client device is not connected to said network through one of said number of approved network service providers comprises allowing access to an aggregator server while otherwise disallowing access to the Internet.

10. The method of claim 1, further comprising dynamically updating a list of said approved network service providers.

11. A network server comprising:
    a processor; and
    a memory communicatively coupled to said processor;
    in which said processor is to:
       determine a public logical address of a client device connected to said server through a network;
       determine, using said public logical address, whether said client device is connected to said network through one of a number of approved network service providers; and
       send a communication to said client device that causes said client device to disconnect from said network if said client device is not connected to said network through one of said number of approved network service providers.

12. The server of claim 11, further comprising, with said server, maintaining a list of logical address ranges that correspond to said approved network service providers.

13. The server of claim 11, wherein said client device relies on said server for content.

14. The server of claim 13, wherein said content on said server that is available to said client device is regional specific.

15. The server of claim 11, wherein said logical address is an Internet Protocol (IP) address.

16. The server of claim 11, wherein an entity providing said client device has an agreement with said approved network service providers that said client device operate on said network only through said approved network service providers.

17. The server of claim 11, wherein said processor is to determine said public logical address of said client device connected to said server through a network in response to receiving a request for said client device.

18. A computer program product for controlling access to a network, said computer program product comprising:
    a non-transitory computer readable storage medium having computer readable code embodied therewith, said computer readable program code comprising:
       computer readable program code configured to determine, from a server, a public logical address of a client device communicatively coupled to said server;
       computer readable program code configured to compare said public logical address to a range of logical addresses that are specific to one of a number of approved network service providers; and
       computer readable program code configured to disconnect said client device from said network if said public logical address does not correspond to a logical address within said range of logical addresses.

19. The computer program product of claim 18, wherein said client device relies on said server for regional specific content.

20. The computer program product of claim 18, wherein an entity providing said client device has an agreement with said approved network service providers that said client device operate on said network only through said approved network service providers.

* * * * *

UNITED STATES PATENT AND TRADEMARK OFFICE
CERTIFICATE OF CORRECTION

PATENT NO. : 9,609,586 B2
APPLICATION NO. : 13/204510
DATED : March 28, 2017
INVENTOR(S) : Sankar Ram Sundaresan et al.

It is certified that error appears in the above-identified patent and that said Letters Patent is hereby corrected as shown below:

On the Title Page

Item (75), Inventors, in Column 1, Line 4, delete "Karnaraka" and insert -- Karnataka --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*